UNITED STATES PATENT OFFICE.

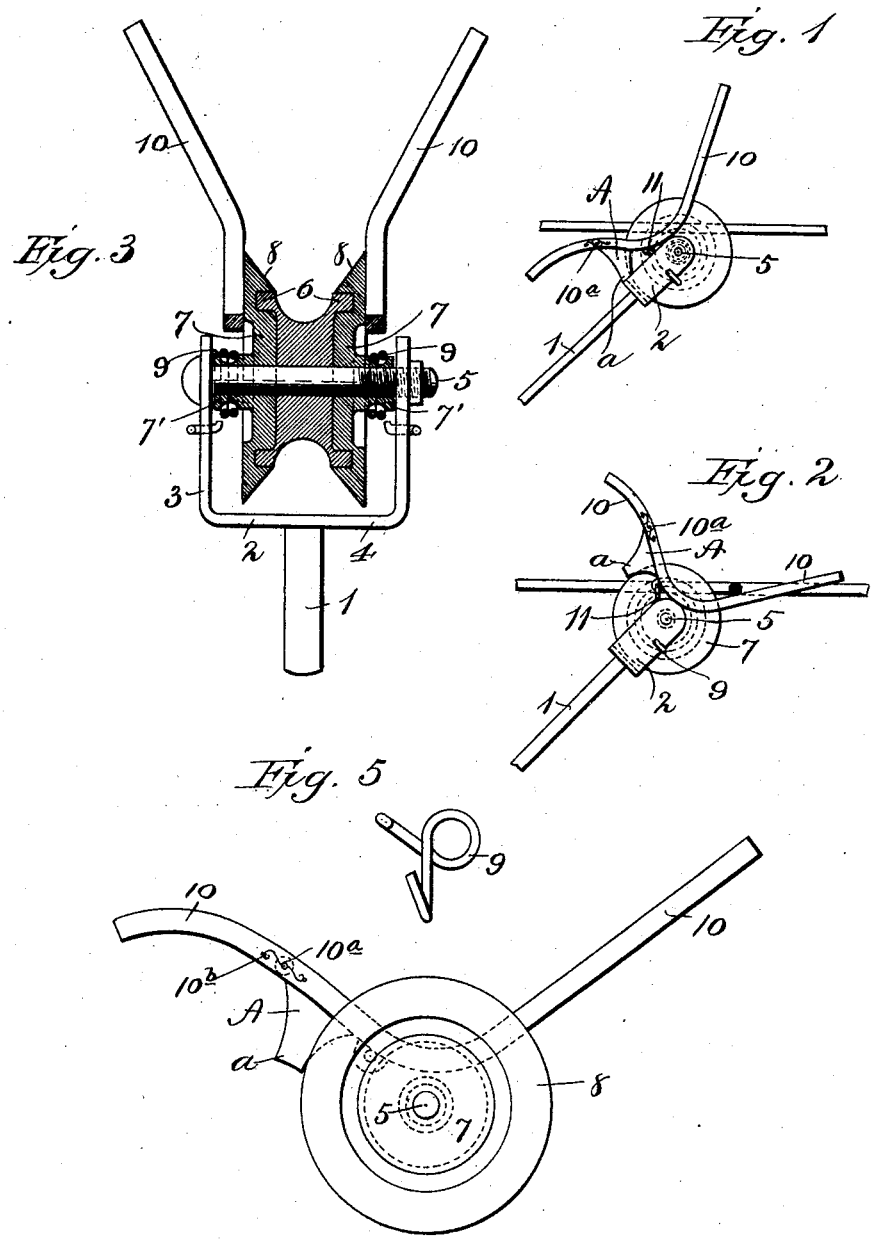

JOHN C. A. RIECKE, OF BALTIMORE, MARYLAND.

TROLLEY-WHEEL.

No. 796,869.　　　　　Specification of Letters Patent.　　　　　Patented Aug. 8, 1905.

Application filed January 14, 1905. Serial No. 241,148.

*To all whom it may concern:*

Be it known that I, JOHN C. A. RIECKE, a citizen of the United States of America, residing at Baltimore, State of Maryland, have invented certain new and useful Improvements in Trolley-Wheels, of which the following is a specification.

This invention relates to trolley-wheels, and particularly to that class thereunder known as "guards and finders."

An object of this invention is to provide means for preventing the accidental displacement of the trolley-wheel from the wire.

Furthermore, an object of this invention is to provide a trolley-wheel having means attached thereto which will hold the wheel parallel with the wire when a cross-wire or other obstruction may be in the path of travel and permit the wheel to pass such obstruction without becoming permanently displaced from the wire.

Furthermore, an object of the invention is to provide automatic means which will hold the trolley-wheel parallel to the wire and also aid in bringing the wheel in contact with the wire.

Finally, an object of the invention is to provide a trolley-wheel which will possess advantages in points of strength, efficiency, and durability and at the same time be light and comparatively inexpensive to manufacture.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, in which—

Figure 1 is a view of a trolley-wheel embodying the invention in contact with a trolley-wire. Fig. 2 is a view showing the arms in position to hold the wheel parallel with the wire while passing under a cross-wire. Fig. 3 is a view showing the circular plate having an inwardly-extending flange and the guard-arms connected thereto. Fig. 4 is a view showing the circular plate having an inwardly-extending flange and the guard-arm connected thereto. Fig. 5 is a view showing the shape of the spring.

In the drawings, 1 indicates a trolley-pole, and 2 a plate having arms 3, bent at right angles to a central portion 4. An axle 5, having a screw-thread on one end, is secured in the outer end of the arms. A trolley-wheel having a grooved peripheral surface is journaled on the axle, said wheel being provided with antifriction balls or rolls; but as this feature is protected by a patent I do not claim it as part of my invention. The wheel is also provided with a flange 6.

On each side of the wheel I provide a circular plate 7, having its edge beveled. The plates 7 are each provided with an annular groove 8, in which the flange 6 of the trolley-wheel fits and rides, thereby preventing the trolley-wire from dropping between the wheel and plates. On the outer central portion of each circular plate 7 I provide an extension-hub 7', having a groove extending around the outer surface, in which a spring 9 (to be hereinafter described) is coiled. Secured to the outer surface of the circular plate arms 10 are provided, said arms being formed at right angles to each other and having one of their ends in an approximately semicircular shape. In combination with the semicircular-shaped ends of the arms and the parts secured to the circular plate lugs A are provided, said lugs being formed integral with the arms and having semicircular recessed ends, which outer ends are adapted to seat against the central portion of the plate attached to the pole.

The spring 9 has hook-shaped ends and is provided with a double coil in its central portion, said coiled portion of the spring being seated in the groove formed on the hub extension of the circular plate. One end of the spring is secured to a lug 11, formed on one of the arms, and its opposite end is secured to the arm in which the axle is secured. The tension-spring is in such relation to the arm that the lug of the arm is held against the central portion of the plate, and the rearwardly-extending arm is held parallel with and on one side of the trolley-wire in the rear of the trolley-wheel. When this arm comes in contact with a cross-wire, it is forced downward and the front arm upward on one side of the trolley-wire in front of the trolley-wheel, thus preventing the accidental displacement of the wheel. A hinged joint $10^a$ is provided in the front arm, said joint being held closed by a spring $10^b$, thus allowing the end of the arm to swing when a broad obstruction on the wire is being passed, and the rear end of the arm is held below the surface of the trolley-wire. As soon as the obstruction of the wire is passed the spring causes the front arm to descend and the rear arm to take its normal position. The front arm, by reason of having its end bent in a curved shape and provided with the hinge 10ª, is prevented from catching the cross-wires or other obstruction of the trolley wire with which they may come in contact.

While the foregoing description relates to a mechanism on one side of the trolley-wheel, it will be understood that the parts are duplicated on the opposite side, so that a guard is provided on each side of the trolley-wheel.

The construction, operation, and advantages will, it is thought, be understood from the foregoing description, it being noted that various changes may be resorted to in the proportions and details of construction for successfully carrying the invention into practice without departing from the scope thereof.

Having fully described my invention, what I claim as new, and desire to secure by Letters Patent, is—

1. In a device of the character described, a plate having its ends bent at right angles to its central portion and provided with apertures, means for securing the plate to a trolley-pole, a shaft secured in the apertures of the arms, a trolley journaled on the shaft, plates having guard-arms, journaled on the shaft on each side of the trolley-wheel, and springs, each having one end secured to a guard-arm and its opposite end secured to an end of the plate carried by the trolley-pole.

2. In a device of the character described, arms secured to a trolley-pole, a shaft seated in the outer ends of said arms, a trolley-wheel having a groove formed in its peripheral surface, and an extending flange formed around its outer edge, plates having guard-arms, each bent at an angle and journaled on the axle on each side of the trolley-wheel and coiled springs each having one end secured to the arm of the trolley-pole and its opposite end connected to one of the guard-arms.

3. In a device of the character described, a plate having ends bent at right angles to the central portion and provided with apertures at each end; an axle secured in the apertures of the arms; a trolley-wheel having a groove in its peripheral surface and provided with side flanges, journaled on the axle, circular plates each having an extension-hub, said extension-hub having a groove in its outer surface and being journaled on the axle, depending guard-arms each bent at an angle secured to the circular plate, lugs formed integral with the depending arms and adapted to seat against the central portion of the plate whereby said arms are held in an inclined position, and a spring for holding each guard-arm in position.

4. In a device of the character described, a trolley-wheel, guard-plates on the sides thereof having beveled edges to direct the wire to the trolley-wheel, guard-arms carried by the plates, an extension hinged to each of the arms, springs for retaining the arms in normal positions, means for carrying the trolley-wheel and means for retaining the guard-arms in operative position.

In testimony whereof I affix my signature, in the presence of two witnesses, this 31st day of December, 1904.

JOHN C. A. RIECKE.

Witnesses:
 LOTTIE E. BARKLEY,
 W. E. LAWSON.